Nov. 10, 1925.

C. H. COLE 1,561,410

BRAKE ATTACHMENT

Filed Feb. 13, 1925

C. H. Cole,
INVENTOR

BY Victor J. Evans,
ATTORNEY

WITNESS:

Patented Nov. 10, 1925.

1,561,410

UNITED STATES PATENT OFFICE.

CHARLES H. COLE, OF PUEBLO, COLORADO.

BRAKE ATTACHMENT.

Application filed February 13, 1925. Serial No. 8,998.

*To all whom it may concern:*

Be it known that I, CHARLES H. COLE, a citizen of the United States, residing at Pueblo, in the county of Pueblo and State of Colorado, have invented new and useful Improvements in Brake Attachments, of which the following is a specification.

This invention relates to improvements in brake attachments for freight cars and the like and includes a multiplicity of loose and fixed pulleys upon the lower end of the brake staff and has fixed and wound thereon a cable which is in turn intermediately connected with the brake arms whereby the brakes may be more quickly applied than at present when using the single pulley upon the lower end of the brake staff.

Another object of the invention is the provision of a brake rod attaching means which includes a pulley loosely mounted thereon, and which has fixed thereto the opposite end of the cable or chain from the fixed pulley on the brake staff.

With the above and other objects in view, the invention further includes the following novel features and details of construction, to be hereinafter more fully described, illustrated in the accompanying drawing and pointed out in the appended claims.

In the drawing:—

Figure 1:
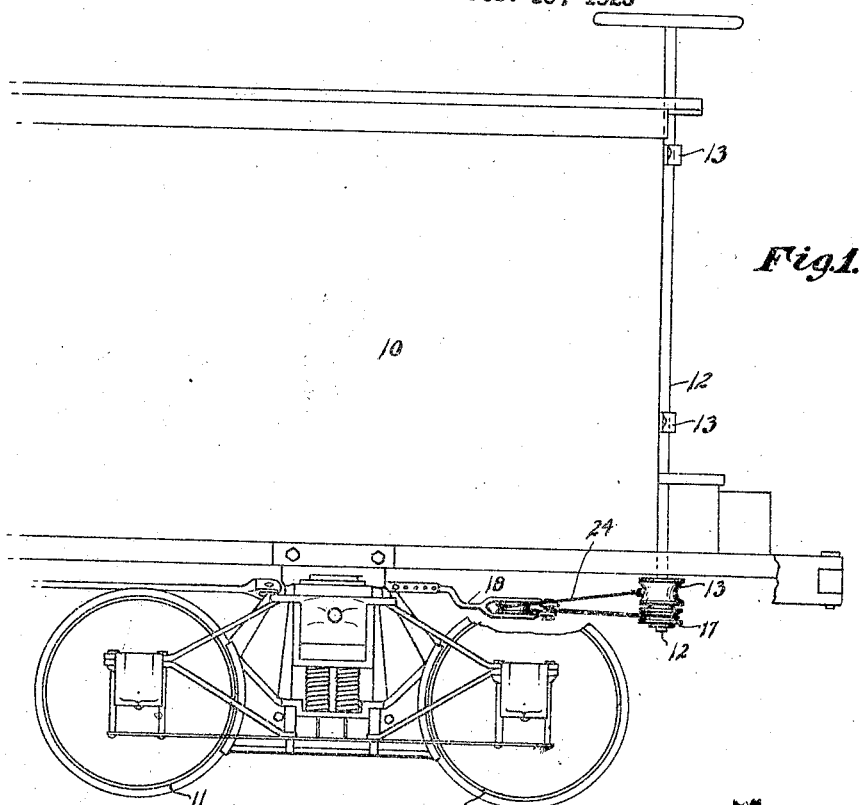
Figure 1 is a fragmentary side elevation of a freight car showing the present invention applied.
Figure 2:
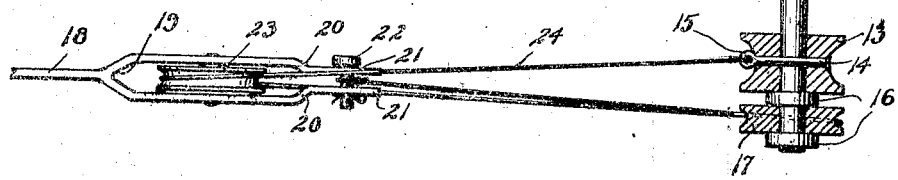
Figure 2 is a fragmentary side elevation of the invention per se.
Figure 3:
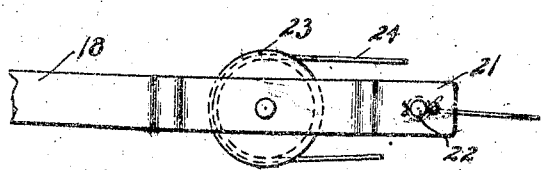
Figure 3 is a top plan view of the brake attaching means per se.

Referring to the drawing in detail, wherein like characters of reference denote corresponding parts, the reference character 10 indicates generally a freight car upon which is mounted the usual carriage wheels with the usual and ordinary type of braking means thereon.

In the present invention we employ the use of the usual and ordinary type of brake staff 12 which is positioned upon the opposite ends of the freight car 10 and is journaled within spaced bearings 13 thereon and has its lower end portion extending below the floor of the car. Fixed adjacent the lower end portion of the brake staff 12 is a pulley 13 having a pin 14 extending transversely through the pulley and brake staff and including a looped end portion 15 upon one end thereof which extends upwardly from the face of the groove therein. Pivotally mounted between bearings 16 upon the brake staff 12 and below the fixed pulley 13 is a pulley 17.

In order to provide the brake rod attaching means I provide a rod 18 having a bifurcated inner end portion 19 and which has the free end portions of the bifurcation inwardly offset as at 20 and terminates in a pair of spaced parallel apertured legs 21 through which is inserted a pin 22 whereby spreading of the legs 21 is restricted. Pivotally mounted between the bifurcated end portion 19 of the rod 18 is a pulley 23. A cable 24 has one end secured within a looped portion 15 of the bolt 14 then looped over the pulley 23 and pulley 17 and has its opposite free end portion secured to the pin 22 between the legs 21 of the rod 18.

It will thus be seen that upon rotation of the brake staff 12 in either direction that the pin 14 will cause the cable 24 to form successive loops upon the pulley 13 which in turn will cause the pulleys 17 and 23 to rotate and pass the cable 24 and which in turn will pull outwardly upon the pin 22 whereby the brake rod for the wheels, not shown, will throw the brake shoes into contacting relation with the wheels 11 to stop the car 10.

The invention is susceptible of various changes in its form, proportions and minor details of construction, and the right is herein reserved to make such changes as properly fall within the scope of the appended claims.

Having described my invention what is claimed is:

1. A brake attachment of the character described comprising a brake staff, fixed and rotatable pulleys arranged upon the lower end portion of the brake staff, a brake rod attachment including a pulley thereon, and a cable wound upon the pulleys and secured to one of the staff pulleys and brake rod whereby the brakes may be applied.

2. A brake attachment of the character described comprising a brake staff, a fixed pulley arranged adjacent the lower end portion of the staff, a rotatable pulley mounted upon the lower end portion of the brake staff, a brake rod attaching member having its outer end portion substantially bifurcated, a rotatable pulley mounted within the bifurcated portion of the brake rod attaching means, and a cable looped upon the rotatable pulleys and having its free end portions fixed to the fixed pulley and brake rod attaching means respectively.

In testimony whereof I affix my signature.

CHARLES H. COLE.